US012699391B2

(12) United States Patent
He et al.

(10) Patent No.: US 12,699,391 B2
(45) Date of Patent: Aug. 4, 2026

(54) CLEANING METHOD AND APPARATUS, AND COMPUTER STORAGE MEDIUM

(71) Applicant: MIDEA ROBOZONE TECHNOLOGY CO., LTD., Suzhou (CN)

(72) Inventors: Bo He, Suzhou (CN); Zexuan Fan, Suzhou (CN)

(73) Assignee: MIDEA ROBOZONE TECHNOLOGY CO., LTD., Suzhou (CN)

( * ) Notice: Subject to any disclaimer, the term of this patent is extended or adjusted under 35 U.S.C. 154(b) by 11 days.

(21) Appl. No.: 18/264,426

(22) PCT Filed: Jul. 21, 2021

(86) PCT No.: PCT/CN2021/107591
§ 371 (c)(1),
(2) Date: Aug. 6, 2023

(87) PCT Pub. No.: WO2022/166123
PCT Pub. Date: Aug. 11, 2022

(65) Prior Publication Data
US 2024/0103521 A1     Mar. 28, 2024

(30) Foreign Application Priority Data

Feb. 7, 2021    (CN) .......................... 202110169002.3

(51) Int. Cl.
*A47L 11/28*          (2006.01)
*A47L 11/40*          (2006.01)
*G05D 1/00*           (2006.01)
(52) U.S. Cl.
CPC ............ *G05D 1/0219* (2013.01); *A47L 11/28* (2013.01); *A47L 11/4011* (2013.01);
(Continued)

(58) Field of Classification Search
CPC .. G05D 1/0219; G05D 1/0225; G05D 1/0274; G05D 1/0246; A47L 11/28;
(Continued)

(56) References Cited

U.S. PATENT DOCUMENTS

2017/0203439 A1*   7/2017   Shin ..................... G05D 1/0274
2019/0094869 A1*   3/2019   Artes ................... G05D 1/0044
(Continued)

FOREIGN PATENT DOCUMENTS

CN           102053623 A        5/2011
CN           106805856 A        6/2017
(Continued)

OTHER PUBLICATIONS

Machine translation of CN111166234A (Year: 2020).*
(Continued)

*Primary Examiner* — Sharidan Carrillo
(74) *Attorney, Agent, or Firm* — K&L Gates LLP

(57) ABSTRACT

The present disclosure discloses a cleaning method and apparatus, and a computer storage medium. The method includes: acquiring a to-be-cleaned area; determining a cleaning section set based on the to-be-cleaned area, the cleaning section set including at least one cleaning section and a cleaning order position corresponding to each of the at least one cleaning section, and the cleaning order position of each of the at least one cleaning section being related to a cleaning path of each of the at least one cleaning section; and cleaning each of the at least one cleaning section in turn based on the cleaning order position corresponding to each of the at least one cleaning section.

5 Claims, 8 Drawing Sheets

(52) U.S. Cl.
CPC ........ *A47L 11/4091* (2013.01); *G05D 1/0225*
(2013.01); *G05D 1/0274* (2013.01); *A47L*
*2201/02* (2013.01); *A47L 2201/04* (2013.01);
*G05D 1/0246* (2013.01)

(58) Field of Classification Search
CPC .............. A47L 11/4011; A47L 11/4091; A47L
2201/02; A47L 2201/04
See application file for complete search history.

(56) References Cited

U.S. PATENT DOCUMENTS

| | | | | |
|---|---|---|---|---|
| 2020/0069140 A1* | 3/2020 | Orzechowski | ....... | G05D 1/0016 |
| 2020/0178748 A1 | 6/2020 | Han et al. | | |
| 2020/0233433 A1* | 7/2020 | Yan | ....................... | G05D 1/0214 |
| 2022/0022718 A1* | 1/2022 | Wu | ........................ | A47L 9/0063 |

FOREIGN PATENT DOCUMENTS

| | | | | |
|---|---|---|---|---|
| CN | 107895374 | A | 4/2018 | |
| CN | 108209750 | A | 6/2018 | |
| CN | 109464074 | A | 3/2019 | |
| CN | 109953700 | A | 7/2019 | |
| CN | 109984684 | A | 7/2019 | |
| CN | 110419985 | A | 11/2019 | |
| CN | 110464263 | A | 11/2019 | |
| CN | 110809745 | A | 2/2020 | |
| CN | 112971645 | A | 6/2021 | |
| CN | 114468856 | A * | 5/2022 | |
| CN | 114594764 | A * | 6/2022 | |
| DE | 102017109219 | A1 | 10/2018 | |
| EP | 3527118 | B1 * | 8/2022 | .............. A47L 9/00 |
| JP | 2012038011 | A | 2/2012 | |
| WO | WO-2008136570 | A1 * | 11/2008 | ............. A47L 9/009 |

OTHER PUBLICATIONS

Machine Translation of CN112971645A (Year: 2021).*
Machine Translation of Kr 20170087403A (Year: 2017).*
ISR mailed Oct. 12, 2021 for International Application No. PCT
/CN2021/107591.
The ISA written opinion received in the counterpart international
application PCT/CN2021/107591, mailed on Oct. 12, 2021, 8 pages
with English translation.
The first Office Action received in the counterpart CN application
202110169002.3, mailed on Nov. 12, 2021, 12 pages with English
translation.
The Grant Notice received in the counterpart CN application
202110169002.3, mailed on Feb. 7, 2022, 5 pages with English
translation.
The extended European search report received in the counterpart EP
application 21924127.0, mailed on Jul. 12, 2024, 7 pages.

\* cited by examiner

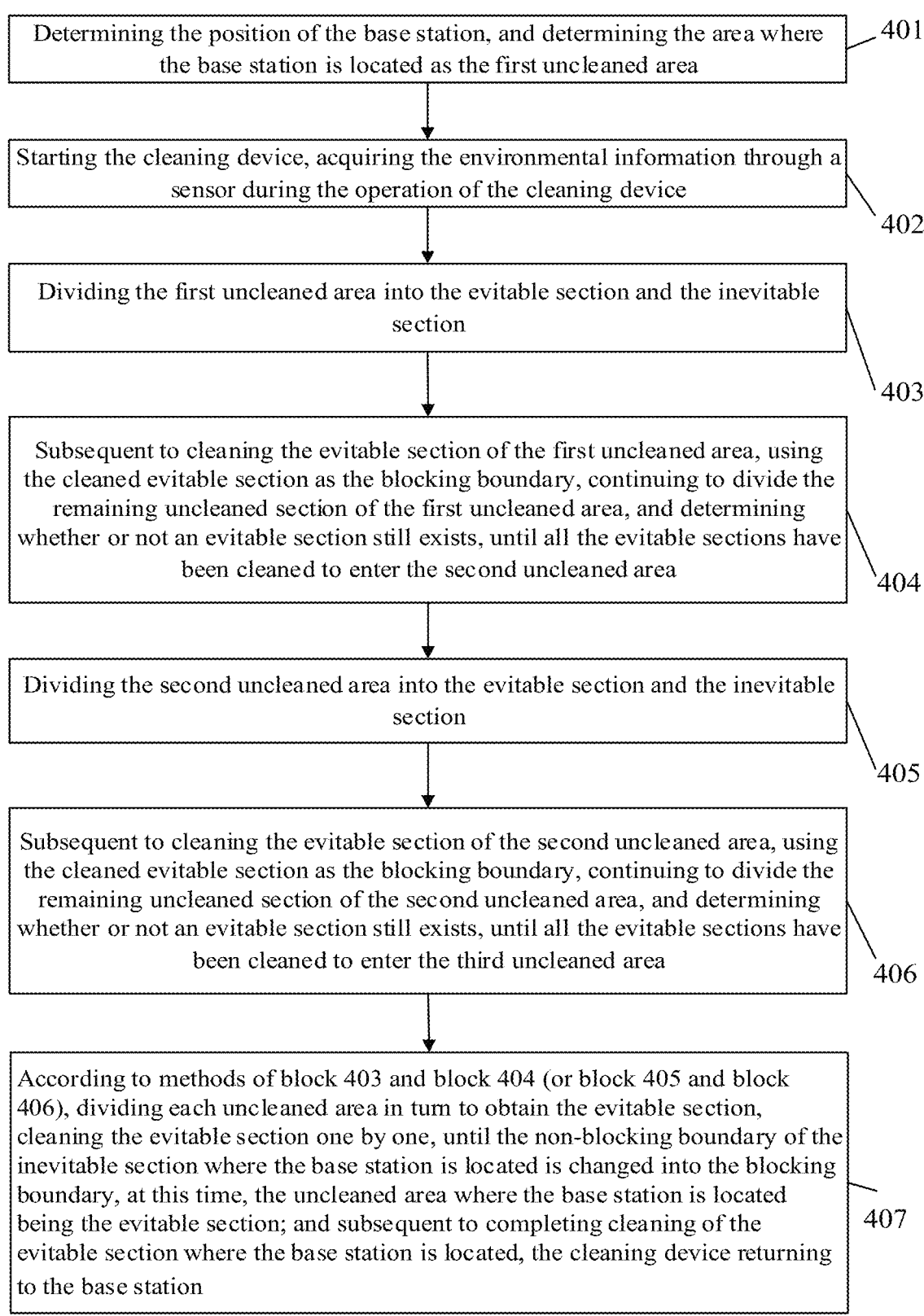

Determining the position of the base station, and determining the area where the base station is located as the first uncleaned area — 401

Starting the cleaning device, acquiring the environmental information through a sensor during the operation of the cleaning device — 402

Dividing the first uncleaned area into the evitable section and the inevitable section — 403

Subsequent to cleaning the evitable section of the first uncleaned area, using the cleaned evitable section as the blocking boundary, continuing to divide the remaining uncleaned section of the first uncleaned area, and determining whether or not an evitable section still exists, until all the evitable sections have been cleaned to enter the second uncleaned area — 404

Dividing the second uncleaned area into the evitable section and the inevitable section — 405

Subsequent to cleaning the evitable section of the second uncleaned area, using the cleaned evitable section as the blocking boundary, continuing to divide the remaining uncleaned section of the second uncleaned area, and determining whether or not an evitable section still exists, until all the evitable sections have been cleaned to enter the third uncleaned area — 406

According to methods of block 403 and block 404 (or block 405 and block 406), dividing each uncleaned area in turn to obtain the evitable section, cleaning the evitable section one by one, until the non-blocking boundary of the inevitable section where the base station is located is changed into the blocking boundary, at this time, the uncleaned area where the base station is located being the evitable section; and subsequent to completing cleaning of the evitable section where the base station is located, the cleaning device returning to the base station — 407

FIG.4

CLEANING METHOD AND APPARATUS, AND COMPUTER STORAGE MEDIUM

CROSS-REFERENCES TO RELATED APPLICATIONS

The present disclosure is a national phase application of International Application No. PCT/CN2021/107591, filed on Jul. 21, 2021, which claims a priority to Chinese Patent Application No. 202110169002.3, filed on Feb. 7, 2021, the entireties of which are herein incorporated by reference.

FIELD

The present disclosure relates to the field of household appliance control technologies, and more particularly, to a cleaning method and apparatus, and a computer storage medium.

BACKGROUND

The launch of autonomous cleaning apparatus gives people great convenience in daily life and reduces labor intensity. Such as household cleaning robots are common autonomous cleaning devices, cleaning robots can travel in the household room automatically while inhaling surrounding dust or impurities to complete floor cleaning. With a growing demand for cleaning, cleaning robots with a floor mopping function is increasingly popular among users.

When a cleaning robot cleans a household space, in most control methods the household space is divided into multiple cleaning areas of same size, with each cleaning area being in a square or a rectangle, and cleaning operations are performed on the multiple cleaning areas in turn in the units of the cleaning areas. For each cleaning area, the cleaning robot performs a cleaning operation on the floor by traveling a zigzag-shaped path within the cleaning area. When the cleaning robot is low in power or when the cleaning robot needs to be cleaned, the cleaning robot is charged or cleaned by returning to an area where a base station is located, and then returns to the on-cleaning cleaning area and continues the cleaning operation.

The cleaning robot with base station for self-cleaning needs to frequently return to the base station for cleaning. If the cleaning operation in related art is performed in turn, the cleaning robot will repeat cleaning the area where the base station is located, which is inefficient and easily contaminates the cleaned area, leading to a secondary contamination.

SUMMARY

To solve the existing problems, embodiments of the present disclosure provide a cleaning method and apparatus, and a computer storage medium.

According to the embodiments of the present disclosure, a cleaning method that is applied to a cleaning device is provided. The method includes: acquiring a to-be-cleaned area; determining a cleaning section set based on the to-be-cleaned area, the cleaning section set including at least one cleaning section and a cleaning order position corresponding to each of the at least one cleaning section, and the cleaning order position of each of the at least one cleaning section being related to a cleaning path of each of the at least one cleaning section; and cleaning each of the at least one cleaning section in turn according to the cleaning order position corresponding to each of the at least one cleaning section.

In some embodiments, the determining the cleaning section set based on the to-be-cleaned area includes: determining the cleaning section set corresponding to the to-be-cleaned area by querying a predetermined cleaning section table. The predetermined cleaning section table includes at least one saved cleaning area and a cleaning section set corresponding to each of the at least one saved cleaning area.

In some embodiments, the to-be-cleaned area includes: a first uncleaned area; and the determining the cleaning section set based on the to-be-cleaned area includes: dividing the first uncleaned area into a first section and a second section, the first section being an inevitable section for the cleaning device to move to any area from a base station, and the second section being an evitable section for the cleaning device to move to any area from the base station; and determining the cleaning section set including the first section and the second section, a cleaning order position of the second section having a higher priority than a cleaning order position of the first section.

In some embodiments, the to-be-cleaned area at least includes: a first uncleaned area; and the determining the cleaning section set based on the to-be-cleaned area includes: dividing the first uncleaned area into a third section and a fourth section, the third section being an inevitable section for the cleaning device to move from a base station to a first residual uncleaned area, the fourth section being an evitable section for the cleaning device to move from the base station to the first residual uncleaned area, and the first residual uncleaned area being an area other than the first uncleaned area in the to-be-cleaned area; determining a second uncleaned area adjacent to the first uncleaned area, dividing the second uncleaned area into a fifth section and a sixth section, the fifth section being an inevitable section for the cleaning device to move from the base station to a second residual uncleaned area, the sixth section being an evitable section for the cleaning device to move from the base station to the second residual uncleaned area, and the second residual uncleaned area being an area other than the first uncleaned area and the second uncleaned area in the to-be-cleaned area; determining a third uncleaned area adjacent to the second uncleaned area, and dividing the third uncleaned area into sections until each residual uncleaned area has been divided to obtain respective sections; and determining the cleaning section set based on the third section and the fourth section corresponding to the first uncleaned area, the fifth section and the sixth section corresponding to the second uncleaned area, and the respective sections corresponding to each residual uncleaned area.

In some embodiments, the determining the cleaning section set based on the to-be-cleaned area includes: acquiring a map of the to-be-cleaned area, the map of the to-be-cleaned area at least including a base station; obtaining at least one to-be-cleaned section by dividing the to-be-cleaned area based on the map of the to-be-cleaned area; determining the cleaning path from the base station to each of the at least one to-be-cleaned section; determining an evitable section corresponding to each of the at least one to-be-cleaned section based on the at least one to-be-cleaned section and the cleaning path corresponding to each of the at least one to-be-cleaned section; and obtaining the cleaning section set by sorting a cleaning order position of the at least one to-be-cleaned section based on the evitable section corresponding to each of the at least one to-be-cleaned section.

In some embodiments, the cleaning each of the at least one cleaning section in turn according to the cleaning order position corresponding to each of the at least one cleaning section includes: recording, during a cleaning process, a current cleaning section as a target cleaning section in response to determining that the cleaning device needs to return to a base station; and returning to the target cleaning section after charging is completed, and continuing to clean according to the cleaning order position.

According to the embodiments of the present disclosure, a cleaning apparatus, applied in a cleaning device, is provided. The apparatus includes a first processing device, a second processing device, and a third processing device.

The first processing device is configured to acquire a to-be-cleaned area.

The second processing device is configured to determine a cleaning section set based on the to-be-cleaned area. The cleaning section set includes at least one cleaning section and a cleaning order position corresponding to each of the at least one cleaning section, and the cleaning order position of each of the at least one cleaning section is related to a cleaning path of each of the at least one cleaning section.

The third processing device is configured to clean each of the at least one cleaning section in turn according to the cleaning order position corresponding to each of the at least one cleaning section.

In some embodiments, the second processing device is configured to determine the cleaning section set corresponding to the to-be-cleaned area by querying a predetermined cleaning section table. The predetermined cleaning section table includes at least one saved cleaning area and a cleaning section set corresponding to each of the at least one saved cleaning area.

In some embodiments, the to-be-cleaned area includes a first uncleaned area. The second processing device is configured to: divide the first uncleaned area into a first section and a second section, the first section being an inevitable section for the cleaning device to move to any area from a base station, and the second section being an evitable section for the cleaning device to move to any area from the base station; and determine the cleaning section set including the first section and the second section, a cleaning order position of the second section having a higher priority than a cleaning order position of the first section.

In some embodiments, the to-be-cleaned area at least includes a first uncleaned area. The second processing device is configured to: divide the first uncleaned area into a third section and a fourth section, the third section being an inevitable section for the cleaning device to move from a base station to a first residual uncleaned area, the fourth section being an evitable section for the cleaning device to move from the base station to the first residual uncleaned area, and the first residual uncleaned area being an area other than the first uncleaned area in the to-be-cleaned area; determine a second uncleaned area adjacent to the first uncleaned area, divide the second uncleaned area into a fifth section and a sixth section, the fifth section being an inevitable section for the cleaning device to move from the base station to a second residual uncleaned area, the sixth section being an evitable section for the cleaning device to move from the base station to the second residual uncleaned area, and the second residual uncleaned area being an area other than the first uncleaned area and the second uncleaned area in the to-be-cleaned area; determine a third uncleaned area adjacent to the second uncleaned area, and divide the third uncleaned area into sections until each residual uncleaned area has been divided to obtain respective sections; and determine the cleaning section set based on the third section and the fourth section corresponding to the first uncleaned area, the fifth section and the sixth section corresponding to the second uncleaned area, and respective sections corresponding to each residual uncleaned area.

In some embodiments, the second processing device is configured to: acquire a map of the to-be-cleaned area, the map of the to-be-cleaned area at least including a base station; obtain at least one to-be-cleaned section by dividing the to-be-cleaned area based on the map of the to-be-cleaned area; determine the cleaning path from the base station to each of the at least one to-be-cleaned section; determine an evitable section corresponding to each of the at least one to-be-cleaned section based on the at least one to-be-cleaned section and the cleaning path corresponding to each of the at least one to-be-cleaned section; and obtain the cleaning section set by sorting a cleaning order position of the at least one to-be-cleaned section based on the evitable section corresponding to each of the at least one to-be-cleaned section.

In some embodiments, the third processing device is configured to record, during a cleaning process, a current cleaning section as a target cleaning section in response to determining that the cleaning device needs to return to a base station, and after charging is completed, return to the target cleaning section and continue to clean according to the cleaning order position.

According to the embodiments of the present disclosure, a cleaning apparatus is further provided. The apparatus includes a processor and a memory storing a computer program that is executable on the processor. The processor is configured to, when executing the computer program, implement the steps of any one of the cleaning methods.

According to the embodiments of the present disclosure, a computer readable storage medium is further provided. The computer readable storage medium has computer instructions stored thereon. The computer instructions, when executed by a processor, implement the steps of any one of the cleaning methods.

The embodiments of the present disclosure provide the cleaning method and apparatus, and the computer storage medium. The method includes: acquiring the to-be-cleaned area; determining the cleaning section set based on the to-be-cleaned area, the cleaning section set including at least one cleaning section and the cleaning order position corresponding to each of the at least one cleaning section, and the cleaning order position of each of the at least one cleaning section being related to the cleaning path of each of the at least one cleaning section; and cleaning each of the at least one cleaning section in turn according to the cleaning order position corresponding to each of the at least one cleaning section. By using the embodiments of the present disclosure, each of the at least one cleaning section is cleaned in turn according to the cleaning order position, avoiding repeated cleaning, and preventing secondary contamination caused by passing through the cleaned section again.

5

FIG. 4 is a flowchart illustrating another cleaning method according to an embodiment of the present disclosure.

Figure 5:
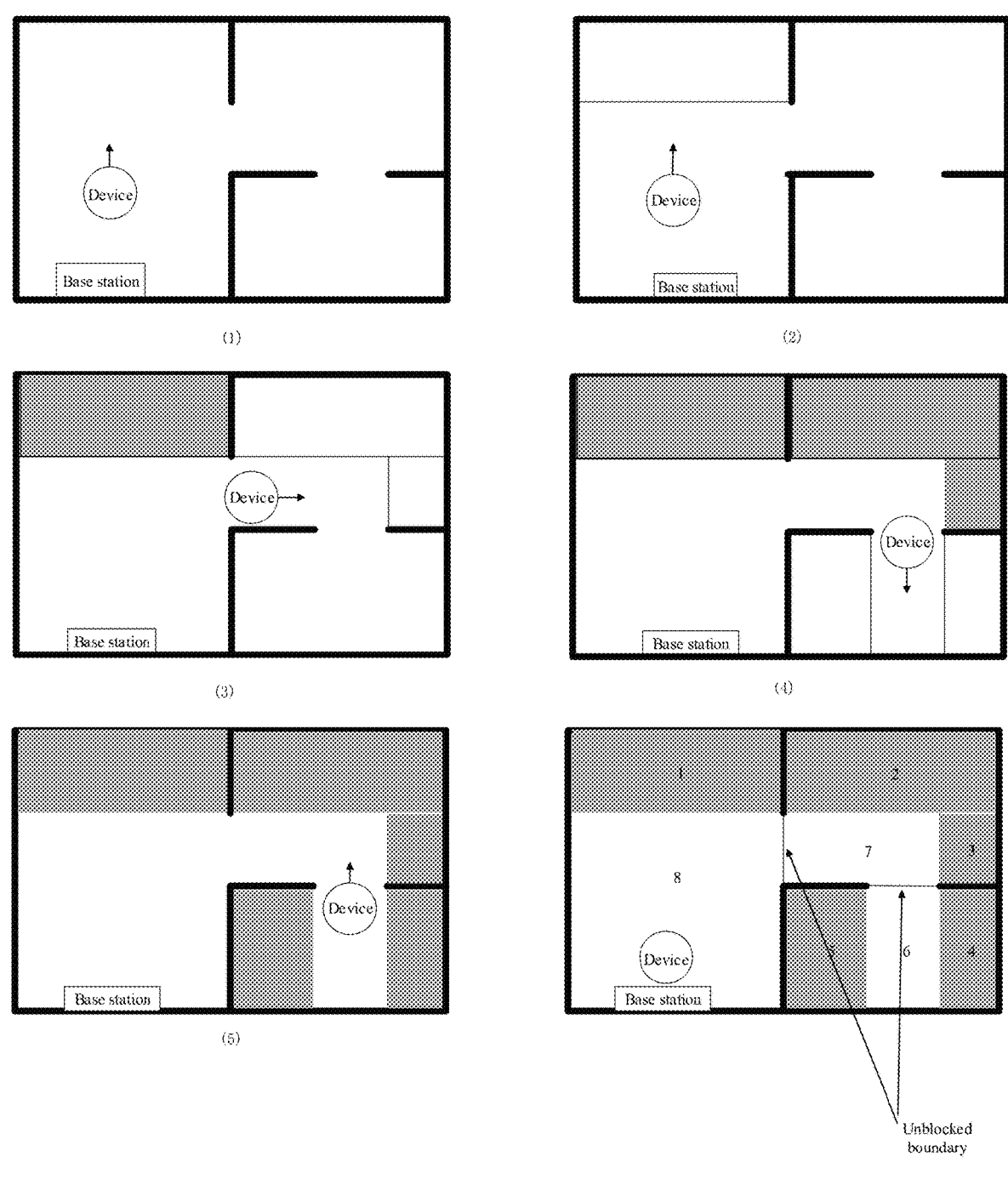

FIG. 5 is a schematic diagram illustrating a division method of a to-be-cleaned area according to an embodiment of the present disclosure.

Figure 6:
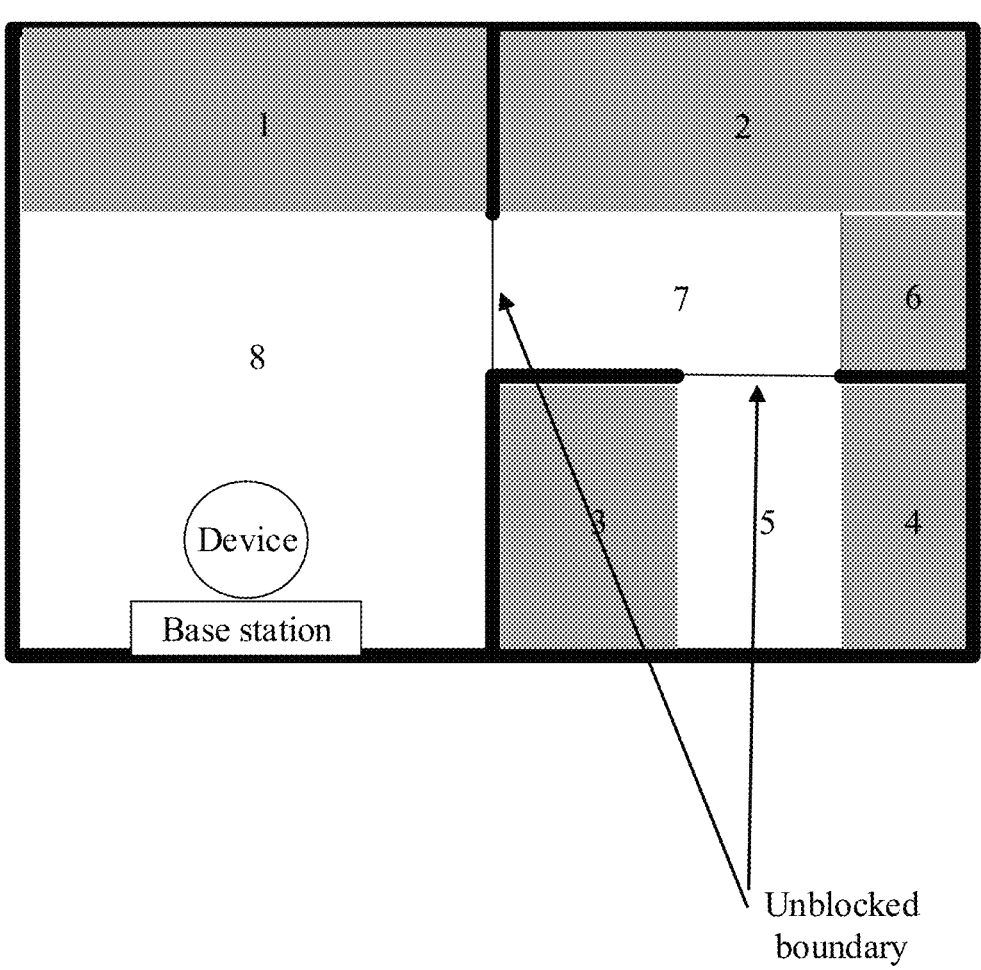

FIG. 6 is a schematic diagram illustrating another division method of a to-be-cleaned area according to an embodiment of the present disclosure.

Figure 7:
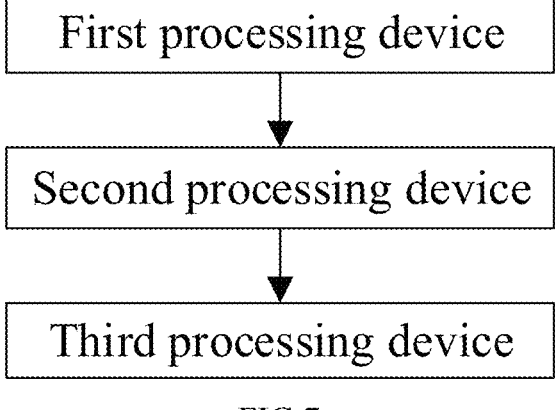

FIG. 7 is a schematic diagram illustrating a structure of a cleaning apparatus according to an embodiment of the present disclosure.

Figure 8:
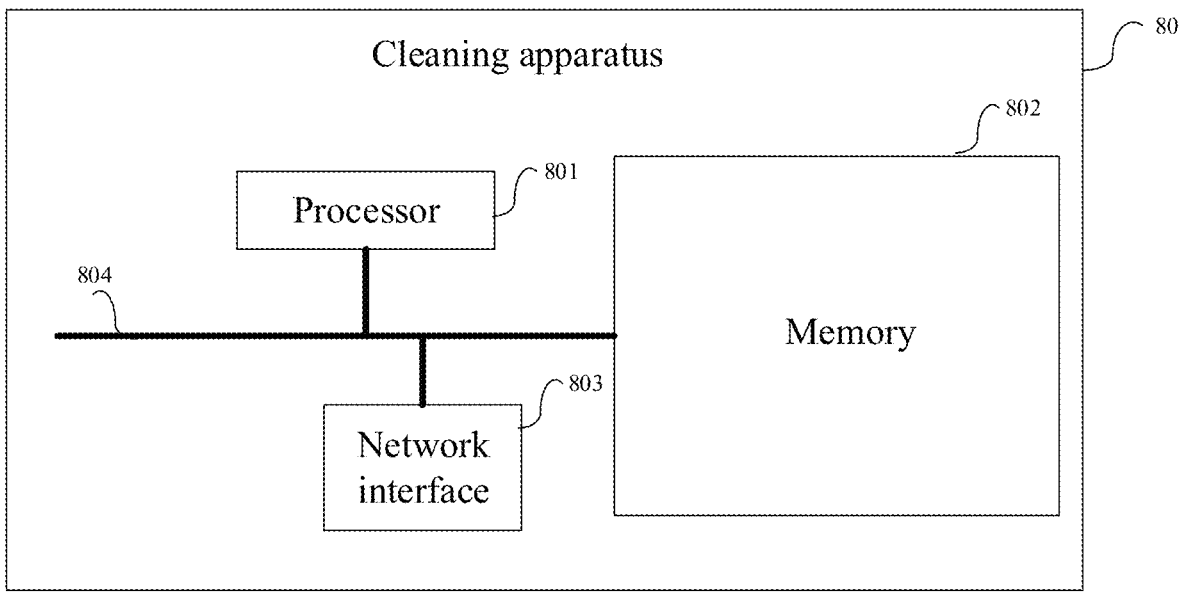

FIG. 8 is a schematic diagram illustrating a structure of another cleaning apparatus according to an embodiment of the present disclosure.

DETAILED DESCRIPTION OF THE DISCLOSURE

The embodiments of the present disclosure, the embodiments of the present disclosure will be clearly described below with accompanying drawings of the embodiments of the present disclosure. The embodiments as described below are merely some embodiments of the present disclosure, rather than all of the embodiments.

Terms such as "first", "second", and "third", in the embodiments in the description, the claims, and the accompanying drawings of the present disclosure, are used to distinguish similar objects, rather than describe a particular order or sequence. In addition, terms "include", "have", and any variations thereof are intended to cover non-exclusive inclusions, e.g., inclusion of a series of steps or units. The method, system, product, or device is not necessarily limited to those clearly listed steps or units, but may include other steps or units that are not clearly listed or are inherent to the process, method, product, or device.

In various embodiments of the present disclosure, a to-be-cleaned area is acquired. A cleaning section set is determined based on the to-be-cleaned area. The cleaning section set includes at least one cleaning section and a cleaning order position corresponding to each of the at least one cleaning section, and the cleaning order position of each of the at least one cleaning section is related to a cleaning path of each of the at least one cleaning section. Each of the at least one cleaning section is cleaned in turn according to the cleaning order position corresponding to each of the at least one cleaning section.

The present disclosure is described in further detail below with reference to the accompanying drawings and specific embodiments.

Figure 1:
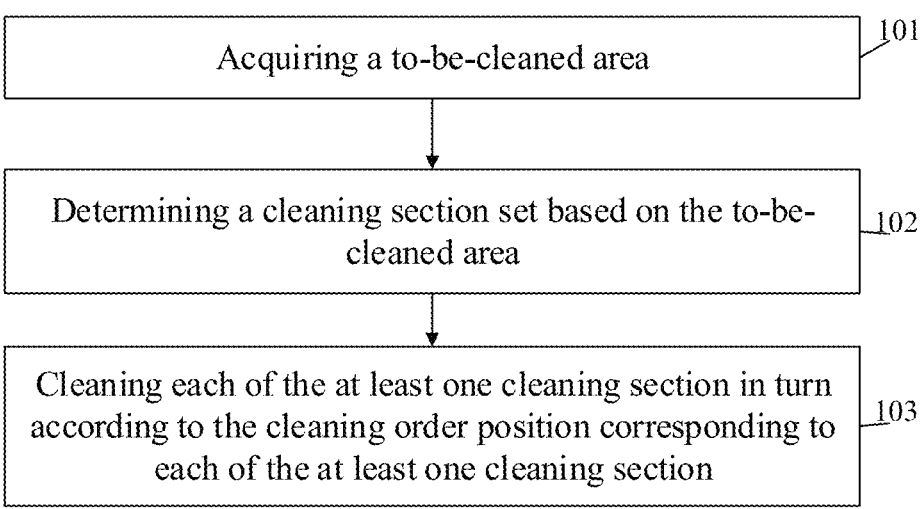
FIG. 1 is a flowchart illustrating a cleaning method according to an embodiment of the present disclosure.

FIG. 1 is a flowchart illustrating a cleaning method according to an embodiment of the present disclosure. As illustrated in FIG. 1, the method includes operations at blocks.

At block 101, the to-be-cleaned area is acquired.

At block 102, the cleaning section set is determined based on the to-be-cleaned area. The cleaning section set includes at least one cleaning section and the cleaning order position corresponding to each of the at least one cleaning section, and the cleaning order position of each of the at least one cleaning section is related to a cleaning path of each of the at least one cleaning section.

At block 103, each of the at least one cleaning section is cleaned in turn according to the cleaning order position corresponding to each of the at least one cleaning section.

In some embodiments, the cleaning section set includes at least one cleaning section and the cleaning order position corresponding to each of the at least one cleaning section.

In a further embodiment, the cleaning section set includes at least one cleaning section, e.g., including: section 1, section 2, section 3 . . . section N.

Each cleaning section has a different cleaning order position, e.g., section 1 corresponds to cleaning order position 1, section 2 corresponds to cleaning order position 2, and section 3 corresponds to cleaning order position 3 . . . section N corresponds to cleaning order position N.

Correspondingly, the cleaning each of the at least one cleaning section in turn according to the cleaning order position corresponding to each of the at least one cleaning section includes: cleaning section 1, section 2 and section 3 . . . section N in turn based on an order of cleaning order position 1, cleaning order position 2 . . . cleaning order position N.

During a cleaning process, if a cleaning device returns to a base station for being charged or other operations halfway during the process, a last cleaning section (or position) is recorded, and after charging is completed, the cleaning device returns to the recorded last cleaning section or a section corresponding to a next order position of the order position corresponding to the last cleaning section for cleaning.

For example, the cleaning device cleans section 2, determines that the cleaning device needs to return to the base station, and records the last cleaning section (or position), i.e., section 2.

After charging is completed, the cleaning device returns to the recorded last cleaning section, i.e., section 2. Or, the cleaning device directly cleans a cleaning section, i.e., section 3, corresponding to a next order position of the order position corresponding to section 2 (accordingly, the cleaning device by default will return to the base station only when it has completed a cleaning of a current section).

A position of the base station is a position for charging the cleaning device, and the base station may be a charge base for the cleaning device.

The cleaning order position of each of the at least one cleaning section is related to the cleaning path of each of the at least one cleaning section. The cleaning path refers to a path that the cleaning device travels from the base station to the corresponding cleaning section.

That is, the cleaning order position of the cleaning section is related to the path that the cleaning device travels from the base station to the corresponding cleaning section.

A cleaning section with the highest cleaning order position will not be passed by the cleaning device to travel to other cleaning sections.

In some embodiments, the cleaning each of the at least one cleaning section in turn according to the cleaning order position corresponding to each of the at least one cleaning section includes: recording, during a cleaning process, a current cleaning section as a target cleaning section in response to determining that the cleaning device needs to return to a base station; and returning to the target cleaning section after charging is completed and continuing to clean according to the cleaning order position.

When the cleaning device is set to estimate whether a cleaning operation for the current cleaning section can be completed based on a power level, it is considered that the cleaning device returns to the base station after the cleaning device will definitely complete the current cleaning section. In such a case, after charging is completed, the cleaning device returns to a cleaning section in a next cleaning order position of the cleaning order position corresponding to the target cleaning section and continues to clean according to the cleaning order position.

In some embodiments, the determining the cleaning section set based on the to-be-cleaned area includes: determining the cleaning section set corresponding to the to-be-cleaned area by querying a predetermined cleaning section table. The predetermined cleaning section table includes at least one saved cleaning area and a cleaning section set corresponding to each of the at least one saved cleaning area.

The method may be applied to the cleaning device, e.g., a cleaning robot, an intelligent floor cleaner, a floor cleaner, or the like.

The cleaning device, after determining the cleaning section set of the cleaning area, may save the cleaning section set of the corresponding cleaning area, and read the saved cleaning section set of the cleaning area (i.e., the saved cleaning area) when needing to acquire the cleaning section set.

The cleaning section set of the saved cleaning area may be saved in the cleaning device or in a server.

For example, the cleaning device may communicate with the server. As a first embodiment, the server is connected to at least one cleaning device. The cleaning device may receive the cleaning section set corresponding to the cleaning area transmitted by the server, and perform the cleaning operation based on the cleaning section set of the cleaning area transmitted by the server. The cleaning device may further transmit the cleaning section set of a cleaning area determined by itself to the server for saving.

As a second embodiment, the server may be connected to at least one terminal (the terminal may be a mobile phone, a tablet computer, a personal computer, a laptop computer, or other terminal device, which can access a network). The terminal may be connected to the cleaning device. The terminal may receive the cleaning section set of the cleaning area transmitted by the server and transmit the cleaning section set of the cleaning area to the cleaning device. The cleaning device may perform the cleaning operation based on the cleaning section set of the cleaning area transmitted by the server. The cleaning device may further transmit the cleaning section set of the cleaning area determined by itself to the terminal, and the terminal transmits the cleaning section set of the corresponding cleaning area to the server.

As a third embodiment, the server may be connected to at least one terminal and at least one cleaning device. Each terminal may further be connected to the cleaning device. Both the terminal and the cleaning device may receive the cleaning section set of the cleaning area transmitted by the server and the terminal may transmit the cleaning section set of the cleaning area to the cleaning device. The cleaning device may perform the corresponding cleaning operation based on the cleaning section set of the cleaning area transmitted by the server or the terminal. The cleaning device may further transmit the cleaning section set of the cleaning area determined by itself to the terminal, and the terminal transmits the cleaning section set of the corresponding cleaning area to the server. Or, the cleaning device may directly transmit the cleaning section set of the cleaning area determined by itself to the server.

In the embodiment of the present disclosure, the cleaning device, the terminal, and the cleaning area each have a unique device identifier. When the cleaning device is connected to the server or the terminal, the terminal or the server may record a corresponding connection relationship based on the device identifier of the cleaning device. When the terminal is connected to the server, the server may record a corresponding connection relationship based on the device identifier of the terminal and/or the device identifier of the cleaning device corresponding to the terminal.

Herein, the cleaning device has a shooting device, such as a camera. The camera may be a single camera or double cameras. The single camera or the double cameras are configured to shoot video data to obtain an environment of the to-be-cleaned area, so that the cleaning section set is determined during operation.

For example, the to-be-cleaned area may be marked with room names, such as master bedroom, secondary bedroom, room one, room two, etc. Each room corresponds to a different cleaning section set.

In practice, if the cleaning device is used for the first time or does not have a save function, it may be necessary to determine the cleaning section while operating. Some of the to-be-cleaned areas are relatively simple, such as only a relatively simple area. It is only necessary to divide the area, and cleaning may be started at the furthest position away from the base station in turn. Some of the to-be-cleaned areas are more complex and need to be divided several times.

In some embodiments, the to-be-cleaned area includes a first uncleaned area.

The determining the cleaning section set based on the to-be-cleaned area includes: dividing the first uncleaned area into a first section and a second section; and determining the cleaning section set including the first section and the second section. A cleaning order position of the second section has a higher priority than a cleaning order position of the first section. The first section is an inevitable section for the cleaning device to move to any area from a base station, and the second section is an evitable section for the cleaning device to move to any area from the base station.

A division of the to-be-cleaned area can be realized based on a position of the base station and a position of a blocking object. The blocking object can be an object occupying a large area of floor such as a wall, a cabinet, a bed, and the like.

In practice, a square area can be divided based on a first blocking surface, a second blocking surface, and a third blocking surface (the blocking surface is a surface of the above mentioned blocking object). For example, in a scene illustrated in FIG. 2(a), the to-be-cleaned area can be divided into two sections and a cleaning order position of section A1 has a higher priority than a cleaning order position of section B1.

A triangular area can be divided based on a first blocking surface and a second blocking surface. For example, in a scene illustrated in FIG. 2(b), the to-be-cleaned area can be divided into two sections and a cleaning order position of section A2 has a higher priority than a cleaning order position of section B2.

An irregular area can be divided based on an area size (which can be predetermined or can be random, but is at least greater than a threshold to avoid excessive computation caused by multiple times of divisions). For example, in a scene illustrated in FIG. 2(c), the to-be-cleaned area can be divided into at least two sections and a cleaning order position of section A3 has a higher priority than a cleaning order position of section B3.

For the divided sections, a further division can be made. A further division for a cleaning section that is closer to the base station (having a relatively low cleaning order position) may be generally performed.

Figure 2A:
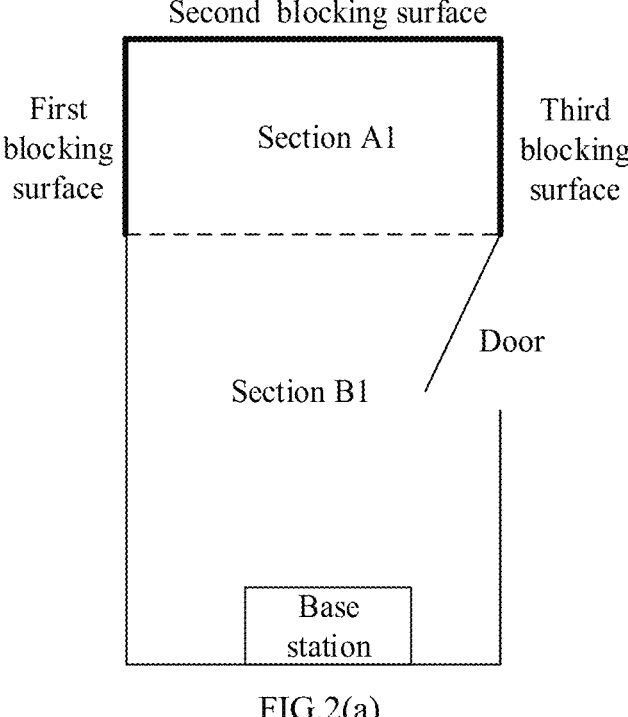
FIG. 2 (*a*), FIG. 2 (*b*), and FIG. 2 (*c*) are schematic diagrams of a kind of area division according to an embodiment of the present disclosure.
Figure 2B:
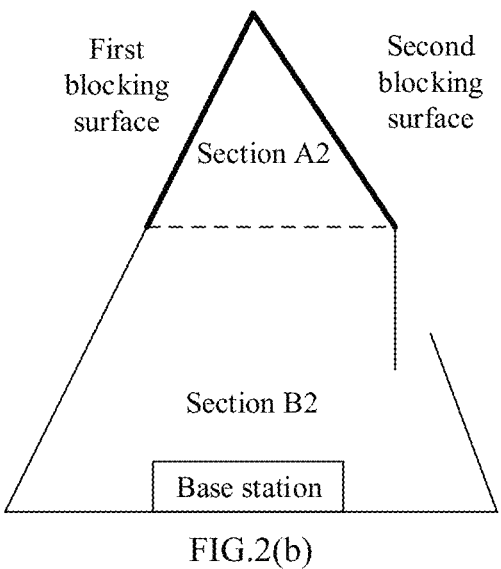
Figure 2C:
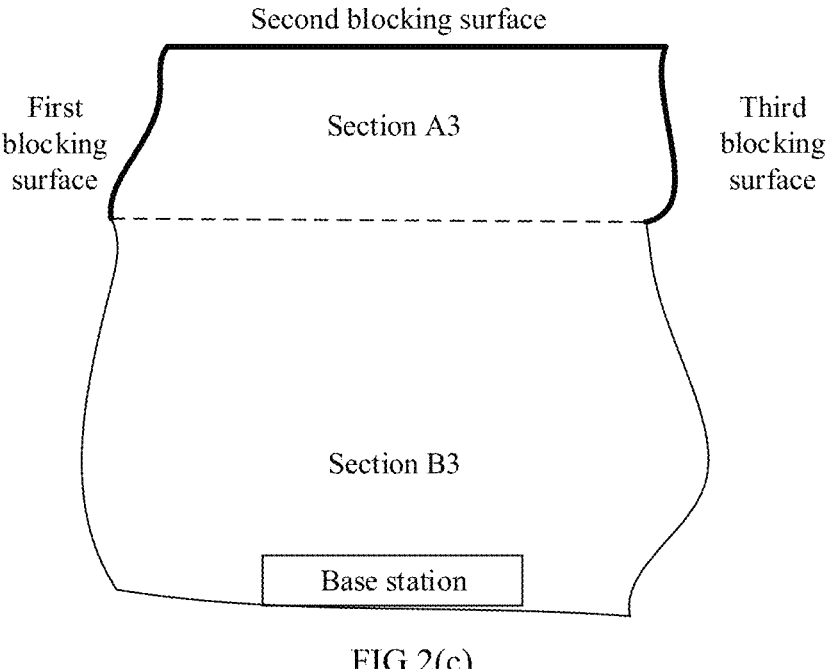
Figure 3A:
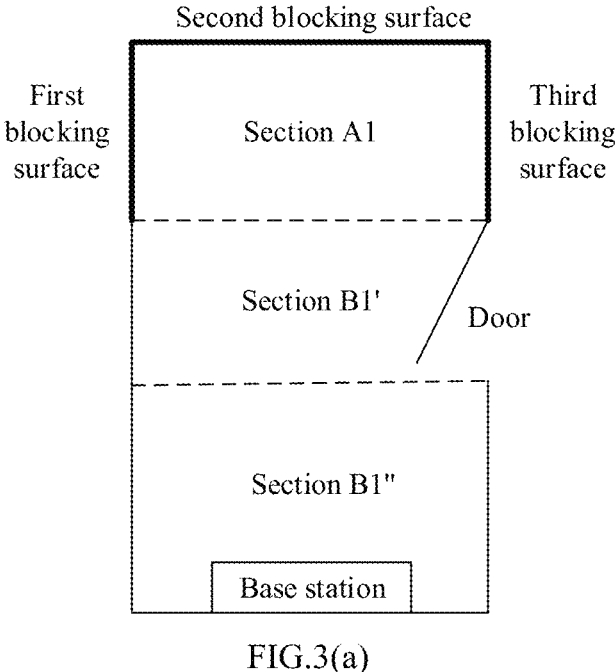
FIG. 3 (*a*), FIG. 3 (*b*), and FIG. 3 (*c*) are schematic diagrams of another kind of area division according to an embodiment of the present disclosure.
Figure 3B:
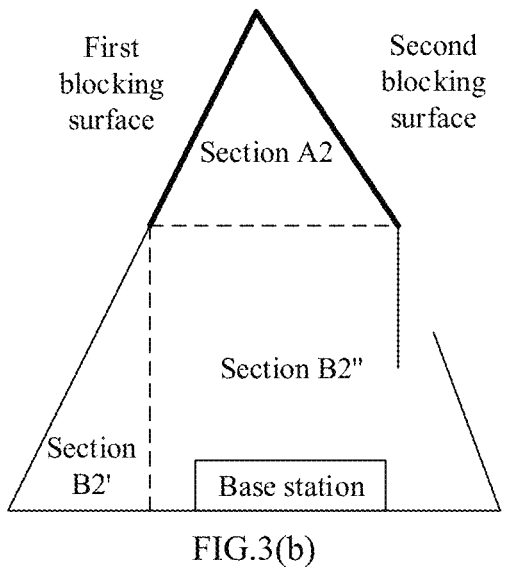
Figure 3C:
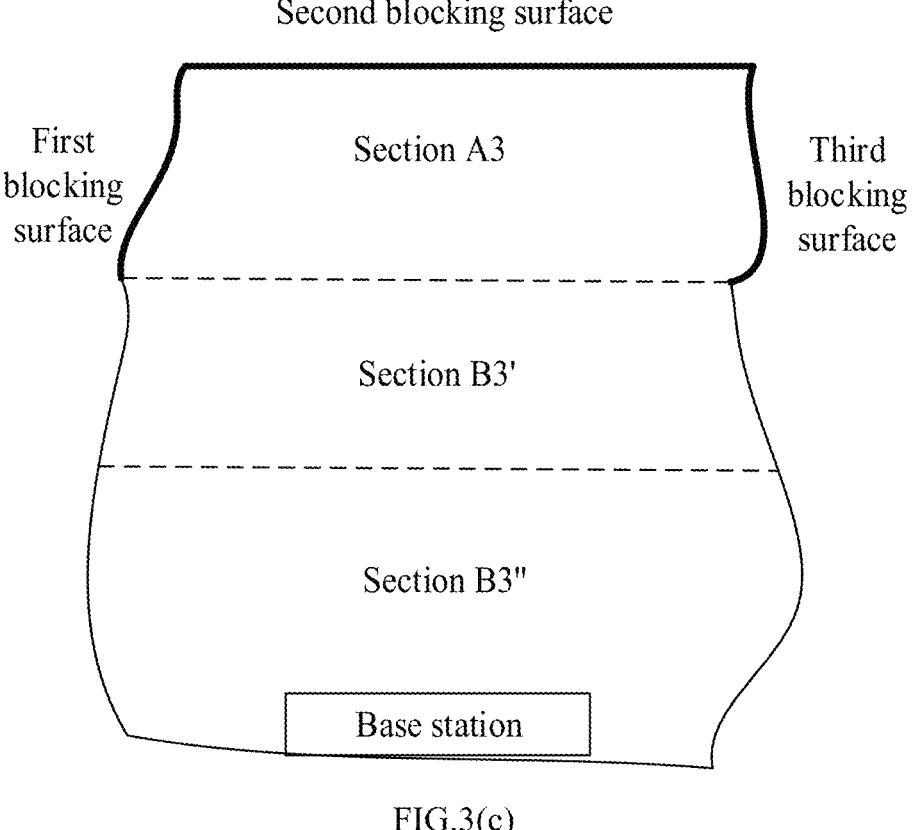

For example, for the scene illustrated in FIG. 2(a), the divided section (denoted as section A1) is used as the blocking object, and another section is further divided (i.e., section B1 is divided) based on three blocking surfaces. The other section can be divided into two sections, i.e., section B1' and section B1" as illustrated in FIG. 3(*a*). The cleaning order position of section B1" has a higher priority than the cleaning order position of section B1".

For the scene illustrated in FIG. 2(*b*), the divided section (denoted as section A2) is used as the blocking object, and another section is further divided (i.e., section B2 is divided) based on the blocking surfaces. The other section can be divided into two sections, i.e., section B2' and section B2" as illustrated in FIG. 3(*b*). The cleaning order position of section B2" has a higher priority than the cleaning order position of section B2".

For the scene illustrated in FIG. 2(*c*), the divided section (denoted as section A3) is used as the blocking object, and another section is further divided (i.e., section B3 is divided) based on the blocking surfaces. The other section can be divided into two sections, i.e., section B3' and section B3" as illustrated in FIG. 3(*c*). The cleaning order position of section B3" has a higher priority than the cleaning order position of section B3".

In some embodiments, the to-be-cleaned area at least includes: a first uncleaned area.

The determining the cleaning section set based on the to-be-cleaned area includes: dividing the first uncleaned area into a third section and a fourth section; determining a second uncleaned area adjacent to the first uncleaned area, and dividing the second uncleaned area into a fifth section and a sixth section; determining a third uncleaned area adjacent to the second uncleaned area, and dividing the third uncleaned area into sections until each residual uncleaned area has been divided to obtain respective sections; and determining the cleaning section set based on the third section and the fourth section corresponding to the first uncleaned area, the fifth section and the sixth section corresponding to the second uncleaned area, and the respective sections corresponding to each residual uncleaned area. The third section is an inevitable section for the cleaning device to move from a base station to a first residual uncleaned area, and the fourth section is an evitable section for the cleaning device to move from the base station to the first residual uncleaned area. The first residual uncleaned area is an area other than the first uncleaned area in the to-be-cleaned area. The fifth section is an inevitable section for the cleaning device to move from the base station to a second residual uncleaned area, and the sixth section is an evitable section for the cleaning device to move from the base station to the second residual uncleaned area. The second residual uncleaned area is an area other than the first uncleaned area and the second uncleaned area in the to-be-cleaned area.

The to-be-cleaned area at least includes the first uncleaned area, and may further include the second uncleaned area, the third uncleaned area, and the residual uncleaned area. The above corresponding uncleaned areas are divided in turn with above steps.

The evitable section is an area that the cleaning device will not pass through when returning to the base station.

The inevitable section is an area that the cleaning device will pass through when returning to the base station.

The inevitable section has a common unblocked boundary with a next uncleaned section.

In the above method, cleaning and division of an area may be performed at the same time. For the evitable section, cleaning may be performed first, and then the section is used as the blocking boundary and will not be re-entered.

For example, the first uncleaned area is divided into the third section and the fourth section. The fourth section is an evitable section for the cleaning device to move from the base station to the first residual uncleaned area. The cleaning order position of the fourth section is the first and the cleaning order position of the third section may be the last.

The second uncleaned area adjacent to the first uncleaned area is divided into the fifth section and the sixth section. The sixth section is the evitable section for the cleaning device to move from the base station to the second residual uncleaned area. The cleaning order position of the sixth section is the second, and the cleaning order position of the fifth section may be the second-to-last.

The third uncleaned area adjacent to the second uncleaned area is divided based on the above-described division of the second uncleaned area and the cleaning order position is determined. By analogy, the to-be-cleaned area is divided and cleaning is completed according to the cleaning order position.

With reference to FIG. 5, FIG. 5 is a schematic diagram illustrating a division method of a to-be-cleaned area according to an embodiment of the present disclosure. As illustrated in FIG. 5, section 1, section 2 section 8 are obtained by dividing the to-be-cleaned area in turn. The machine in the diagram is the cleaning device, such as the cleaning robot.

In practice, the cleaning device may pre-acquire a map of the to-be-cleaned area, and obtain the cleaning section set by dividing the to-be-cleaned area based on the map of the to-be-cleaned area.

Based on this, in some embodiments, the cleaning each of the at least one cleaning section in turn according to the cleaning order position corresponding to each of the at least one cleaning section includes: acquiring a map of the to-be-cleaned area, the map of the to-be-cleaned area at least including a base station; obtaining at least one to-be-cleaned section by dividing the to-be-cleaned area based on the map of the to-be-cleaned area; determining the cleaning path from the base station to each of the at least one to-be-cleaned section; determining an evitable section corresponding to each of the at least one to-be-cleaned section based on the at least one to-be-cleaned section and the cleaning path corresponding to each of the at least one to-be-cleaned section; and sorting a cleaning order position of the at least one to-be-cleaned section based on the evitable section corresponding to each of the at least one to-be-cleaned section to obtain the cleaning section set.

An acquisition method may be obtained by drawing subsequent to travelling once in a corresponding area in advance. In one embodiment, the cleaning device may be connected to a terminal owned by a user, and the user draws the map of the to-be-cleaned area through the terminal, and sends the map of the to-be-cleaned area to the cleaning device.

For example, four sections are obtained based on the blocking surface division, which are denoted as section 1, section 2, section 3, and section 4, respectively.

The cleaning device reaches section 1 from the base station by passing through section 2, section 3, and section 4.

The cleaning device reaches section 2 from the base station by passing through section 3 and section 4.

The cleaning device reaches section 3 from the base station by passing through section 4.

In this way, a cleaning order position of section 1 can be determined to have a higher priority than the cleaning order positions of section 2, section 3, and section 4. The cleaning order position of section 2 has a higher priority than the cleaning order positions of section 3 and section 4. The cleaning order position of section 3 has a higher priority than the cleaning order position of section 4.

Further, the determined cleaning section set includes section 1, section 2, section 3, and section 4, and the cleaning order position is from top to down as follows: section 1, section 2, section 3, and section 4.

The cleaning device may have a processing device, a camera, a positioning device, and the like, and is configured to perform the steps described above. For example, the camera is configured to acquire environmental information, and the processing device is configured to divide into the sections and perform the cleaning operation. The positioning device is configured to determine the position where the cleaning device is located. Above functional division of the processing device, the camera, and the positioning device is only an example, and is not a limitation to a division of specific functional devices. Different devices can be configured based on needs to realize a method as described above in practice.

FIG. 4 is a flowchart illustrating another cleaning method according to an embodiment of the present disclosure. As illustrated in FIG. 4, the method can be applied to the cleaning device, such as the cleaning robot and the method includes operations at blocks.

At block 401, the position of the base station is determined, and the area where the base station is located is determined as the first uncleaned area.

At block 402, the cleaning device is started, and the environmental information is acquired through a sensor during the operation of the cleaning device.

At block 403, the first uncleaned area is divided into the evitable section and the inevitable section.

The evitable section is an area that the cleaning device will not pass through when returning to the base station.

The inevitable section is an area that the cleaning device will pass through when returning to the base station.

The inevitable section has a common unblocked boundary with the next uncleaned section.

For example, in FIG. 5, the first uncleaned area is divided into the evitable section and the inevitable section. Section 1 can be the evitable section, and section 8 can be the inevitable section.

At block 404, after the evitable section of the first uncleaned area is cleaned, the cleaned evitable section is used as the blocking boundary. The remaining uncleaned section of the first uncleaned area is continued to be divided, and whether or not an evitable section still exists is determined, until all the evitable sections have been cleaned to enter the second uncleaned area.

For example, in FIG. 5, after section 1 is cleaned, cleaned section 1 is used as the blocking boundary. The remaining uncleaned section of the first uncleaned area is continued to be divided, and whether or not an evitable section still exists is determined. When the evitable section does not exist, the cleaning device enters the second uncleaned area.

At block 405, the second uncleaned area is divided into the evitable section and the inevitable section.

For example, the second uncleaned area is divided into the evitable section and the inevitable section, and section 2 may be the evitable section and the other section is the inevitable section.

At block 406, after the evitable section of the second uncleaned area is cleaned, the cleaned evitable section is used as the blocking boundary. The remaining uncleaned section of the second uncleaned area is continued to be divided, and whether or not an evitable section still exists is determined, until all the evitable sections have been cleaned to enter the third uncleaned area.

For example, in FIG. 5, after section 2 is cleaned, cleaned section 2 is used as the blocking boundary. The remaining uncleaned section of the second uncleaned area is continued to be divided, and whether or not an evitable section still exists is determined. When the evitable section does not exist, the cleaning device enters the third uncleaned area.

At block 407, according to methods of block 403 and block 404 (or block 405 and block 406), each uncleaned area is divided in turn to obtain the evitable section, and the evitable section is cleaned one by one, until the unblocked boundary of the inevitable section where the base station is located is changed into the blocking boundary. At this time, the uncleaned area where the base station is located is the evitable section. Subsequent to completing cleaning of the evitable section where the base station is located, the cleaning device returns to the base station.

For the illustration in FIG. 5, the following sections can be obtained by division: section 1, section 2 section 8. The section numbers further represent the cleaning order position for convenience. As illustrated in FIG. 6, cleaning sections with different cleaning order positions can be obtained by division.

FIG. 7 is a schematic diagram illustrating a structure of a cleaning apparatus according to an embodiment of the present disclosure. The cleaning apparatus is applied in the cleaning device, as illustrated in FIG. 7, and the apparatus includes a first processing device, a second processing device, and a third processing device.

The first processing device is configured to acquire a to-be-cleaned area.

The second processing device is configured to determine a cleaning section set based on the to-be-cleaned area. The cleaning section set includes at least one cleaning section and a cleaning order position corresponding to each of the at least one cleaning section, and the cleaning order position of each of the at least one cleaning section is related to a cleaning path of each of the at least one cleaning section.

The third processing device is configured to clean each of the at least one cleaning section in turn according to the cleaning order position corresponding to each of the at least one cleaning section.

In some embodiments, the second processing device is configured to determine the cleaning section set corresponding to the to-be-cleaned area by querying a predetermined cleaning section table.

The predetermined cleaning section table includes at least one saved cleaning area and a cleaning section set corresponding to each of the at least one saved cleaning area.

In some embodiments, the to-be-cleaned area includes a first uncleaned area.

The second processing device is configured to: divide the first uncleaned area into a first section and a second section; and determine the cleaning section set including the first section and the second section, a cleaning order position of the second section having a higher priority than a cleaning order position of the first section. The first section is an inevitable section for the cleaning device to move to any area from a base station, and the second section is an evitable section for the cleaning device to move to any area from the base station.

In some embodiments, the to-be-cleaned area at least includes a first uncleaned area.

The second processing device is configured to divide the first uncleaned area into a third section and a fourth section. The third section is an inevitable section for the cleaning device to move from a base station to a first residual uncleaned area, and the fourth section is an evitable section for the cleaning device to move from the base station to the first residual uncleaned area. The first residual uncleaned area is an area other than the first uncleaned area in the to-be-cleaned area.

The second processing device is further configured to determine a second uncleaned area adjacent to the first uncleaned area, and divide the second uncleaned area into a fifth section and a sixth section. The fifth section is an inevitable section for the cleaning device to move from the base station to a second residual uncleaned area. The sixth section is an evitable section for the cleaning device to move from the base station to the second residual uncleaned area. The second residual uncleaned area is an area other than the first uncleaned area and the second uncleaned area in the to-be-cleaned area.

The second processing device is further configured to determine a third uncleaned area adjacent to the second uncleaned area, and divide the third uncleaned area into sections until each residual uncleaned area has been divided to obtain respective sections.

The second processing device is further configured to determine the cleaning section set based on the third section and the fourth section corresponding to the first uncleaned area, the fifth section and the sixth section corresponding to the second uncleaned area, and respective sections corresponding to each residual uncleaned area.

In some embodiments, the second processing device is configured to acquire a map of the to-be-cleaned area. The map of the to-be-cleaned area at least includes a base station.

The second processing device is further configured to obtain at least one to-be-cleaned section by dividing to-be-cleaned area based on the map of the to-be-cleaned area.

The second processing device is further configured to determine the cleaning path from the base station to each of the at least one to-be-cleaned section.

The second processing device is further configured to determine an evitable section corresponding to each of the at least one to-be-cleaned section based on the at least one to-be-cleaned section and the cleaning path corresponding to each of the at least one to-be-cleaned section.

The second processing device is further configured to sort a cleaning order position of the at least one to-be-cleaned section based on the evitable section corresponding to each of the at least one to-be-cleaned section to obtain the cleaning section set.

In some embodiments, the third processing device is configured to record, during a cleaning process, a current cleaning section as a target cleaning section in response to determining that the cleaning device needs to return to a base station; and return to the target cleaning section after charging is completed and continue to clean according to the cleaning order position.

It should be noted that the cleaning apparatus provided in the above embodiments, when implementing the corresponding cleaning method, is only exemplified by a division of the above-described program devices. In practice, the above processing can be assigned to be completed by different program devices as needed, i.e., an internal structure of the server can be divided into different program devices to complete all or part of the above-described processing. In addition, the apparatus provided in the above embodiments belongs to a same concept as the corresponding method embodiments, and reference of the specific implementation process may be made to the method embodiments, which will not be repeated herein.

FIG. 8 is a schematic diagram illustrating a structure of another cleaning apparatus according to an embodiment of the present disclosure. As illustrated in FIG. 8, the apparatus 80 is applied to the server, and includes a processor 801 and a memory 802 storing a computer program that is executable on the processor. The processor 801, when executing the computer program, is configured to perform: acquiring a to-be-cleaned area; determining a cleaning section set based on the to-be-cleaned area, The cleaning section set including at least one cleaning section and a cleaning order position corresponding to each of the at least one cleaning section, and the cleaning order position of each of the at least one cleaning section being related to a cleaning path of each of the at least one cleaning section; and cleaning each of the at least one cleaning section in turn according to the cleaning order position corresponding to each of the at least one cleaning section.

In an embodiment, the processor 801, when executing the computer program, is further configured to perform: determining the cleaning section set corresponding to the to-be-cleaned area by querying a predetermined cleaning section table.

The predetermined cleaning section table includes at least one saved cleaning area and a cleaning section set corresponding to each of the at least one saved cleaning area.

In an embodiment, the processor 801, when executing the computer program, is further configured to perform: dividing the first uncleaned area into a first section and a second section, The first section being an inevitable section for the cleaning device to move to any area from a base station, and the second section being an evitable section for the cleaning device to move to any area from the base station; and determining the cleaning section set including the first section and the second section, a cleaning order position of the second section having a higher priority than a cleaning order position of the first section.

In an embodiment, the processor 801, when executing the computer program, is further configured to perform: dividing the first uncleaned area into a third section and a fourth section, the third section being an inevitable section for the cleaning device to move from a base station to a first residual uncleaned area, the fourth section being an evitable section for the cleaning device to move from the base station to the first residual uncleaned area, and the first residual uncleaned area being an area other than the first uncleaned area in the to-be-cleaned area;

determining a second uncleaned area adjacent to the first uncleaned area, and dividing the second uncleaned area into a fifth section and a sixth section, the fifth section being an inevitable section for the cleaning device to move from the base station to a second residual uncleaned area, the sixth section being an evitable section for the cleaning device to move from the base station to the second residual uncleaned area, and the second residual uncleaned area being an area other than the first uncleaned area and the second uncleaned area in the to-be-cleaned area;

determining a third uncleaned area adjacent to the second uncleaned area, and dividing the third uncleaned area into sections until each residual uncleaned area has been divided to obtain respective sections; and determining the cleaning section set based on the third section and the fourth section corresponding to the first uncleaned area, the fifth section and the sixth section corresponding to the second uncleaned area, and the respective sections corresponding to each residual uncleaned area.

In an embodiment, the processor 801, when executing the computer program, is configured to perform: acquiring a map of the to-be-cleaned area, the map of the to-be-cleaned area at least including a base station;

obtaining at least one to-be-cleaned section by dividing the to-be-cleaned area based on the map of the to-be-cleaned area;

determining the cleaning path from the base station to each of the at least one to-be-cleaned section;

determining an evitable section corresponding to each of the at least one to-be-cleaned section based on the at least one to-be-cleaned section and the cleaning path corresponding to each of the at least one to-be-cleaned section; and sorting a cleaning order position of the at least one to-be-cleaned section based on the evitable section corresponding to each of the at least one to-be-cleaned section to obtain the cleaning section set.

In an embodiment, the processor 801, when executing the computer program, is further configured to perform: recording, during a cleaning process, a current cleaning section as a target cleaning section in response to determining that the cleaning device needs to return to a base station; and returning to the target cleaning section after charging is completed and continuing to clean according to the cleaning order position.

It should be noted that the cleaning apparatus and the cleaning method embodiments provided in the above embodiments belong to the same concept, and reference of the specific implementation process thereof may be made to the method embodiments, which will not be repeated herein.

In practice, the apparatus 80 may further include at least one network interface 803. Various components in the apparatus 80 are coupled together through a bus system 804. It will be understood that the bus system 804 realizes connection communication between the components. The bus system 804 includes a power bus, a control bus, and a status signal bus, in addition to a data bus. However, for clarity of illustration, various buses are denoted as the bus system 804 in FIG. 8. A number of the processors 801 may be at least one. At least one network interface 803 is configured to communicate between the apparatus 80 and other devices by wired or wireless methods.

The memory 802 in an embodiment of the present disclosure stores various types of data to support operation of the apparatus 80.

Methods disclosed in the embodiments of the present disclosure may be applied in, or implemented by, the processor 801. The processor 801 may be an integrated circuit chip having signal processing capabilities. In an implementation, actions of the above method may be accomplished by an integrated logic circuit in hardware in the processor 801 or by instructions in the form of software. The above processor 801 may be a general-purpose processor, a Digital Signal Processor (DSP), or other programmable logic devices, a discrete gate or a transistor logic device, and a discrete hardware component. The method, actions, and logic block diagrams according to any of the embodiments of the present disclosure may be implemented or performed by the processor 801. The general-purpose processor may be a microprocessor, or the processor may be any conventional processor, etc. The actions of the method disclosed in combination with any of the embodiments of the present disclosure may be directly embodied as performed by a hardware decoding processor or performed by a combination of a hardware module and a software module in a decoding processor. The software module may be in the storage medium, and the storage medium is located in the memory 802. The processor 801 reads information from the memory 802 and completes the actions of the above method in combination with the hardware.

In exemplary embodiments, the apparatus 80 may be implemented by one or more Application Specific Integrated Circuits (ASICs), DSPs, Programmable Logic Devices (PLDs), Complex Programmable Logic Devices (CPLDs), Field Programmable Gate Arrays (FPGAs), general purpose processors, controllers, Microcontroller Units (MCUs), Micro Processor Units (MPUs), or other electronic elements, to perform the above methods.

According to the embodiments of the present disclosure, a computer readable storage medium is further provided. The computer readable storage medium has a computer program stored thereon. The computer program, when executed by a processor, performs: acquiring a to-be-cleaned area; determining a cleaning section set based on the to-be-cleaned area, the cleaning section set including at least one cleaning section and a cleaning order position corresponding to each of the at least one cleaning section, and the cleaning order position of each of the at least one cleaning section being related to a cleaning path of each of the at least one cleaning section; and cleaning each of the at least one cleaning section in turn according to the cleaning order position corresponding to each of the at least one cleaning section.

In an embodiment, the computer program, when executed by the processor, performs: determining the cleaning section set corresponding to the to-be-cleaned area by querying a predetermined cleaning section table.

The predetermined cleaning section table includes at least one saved cleaning area and a cleaning section set corresponding to each of the at least one saved cleaning area.

In an embodiment, the computer program, when executed by the processor, performs: dividing the first uncleaned area into a first section and a second section, the first section being an inevitable section for the cleaning device to move to any area from a base station, and the second section being an evitable section for the cleaning device to move to any area from the base station; and determining the cleaning section set including the first section and the second section, a cleaning order position of the second section having a higher priority than a cleaning order position of the first section.

In an embodiment, the computer program, when executed by the processor, performs: dividing the first uncleaned area into a third section and a fourth section, the third section being an inevitable section for the cleaning device to move from a base station to a first residual uncleaned area, the fourth section being an evitable section for the cleaning device to move from the base station to the first residual uncleaned area, and the first residual uncleaned area being an area other than the first uncleaned area in the to-be-cleaned area;

determining a second uncleaned area adjacent to the first uncleaned area, and dividing the second uncleaned area into a fifth section and a sixth section, the fifth section being an inevitable section for the cleaning device to move from the base station to a second residual uncleaned area, and the sixth section being an evitable section for the cleaning device to move from the base station to the second residual uncleaned area, and the second residual uncleaned area being an area other than the first uncleaned area and the second uncleaned area in the to-be-cleaned area;

determining a third uncleaned area adjacent to the second uncleaned area, and dividing the third uncleaned area into sections until each residual uncleaned area has been divided to obtain respective sections; and determining the cleaning section set based on the third section and the fourth section corresponding to the first uncleaned area, the fifth section and the sixth section corresponding to the second uncleaned area, and the respective sections corresponding to each residual uncleaned area.

In an embodiment, the computer program, when executed by the processor, performs:

acquiring a map of the to-be-cleaned area, the map of the to-be-cleaned area at least including a base station;

obtaining at least one to-be-cleaned section by dividing the to-be-cleaned area based on the map of the to-be-cleaned area;

determining the cleaning path from the base station to each of the at least one to-be-cleaned section;

determining an evitable section corresponding to each of the at least one to-be-cleaned section based on the at least one to-be-cleaned section and the cleaning path corresponding to each of the at least one to-be-cleaned section; and sorting a cleaning order position of the at least one to-be-cleaned section based on the evitable section corresponding to each of the at least one to-be-cleaned section to obtain the cleaning section set.

In an embodiment, the computer program, when executed by the processor, performs: recording, during a cleaning process, a current cleaning section as a target cleaning section in response to determining that the cleaning device needs to return to a base station; and returning to the target cleaning section after charging is completed and continuing to clean according to the cleaning order position.

In several embodiments provided by the present disclosure, it should be understood that the apparatus and method disclosed can be implemented in other ways. The device embodiments described above are merely exemplary. For example, the units are merely divided based on logic functions. In practical implementation, the units can be divided in other manners. For example, multiple units or components can be combined or integrated into another system, or some features can be omitted or not executed. In addition, mutual coupling or direct coupling or communication connection of individual components described or discussed can be implemented as indirect coupling or communication connection via some interfaces, devices or units, which may be electrical, mechanical or in other forms.

The units illustrated as separate components may be or not be separated physically, and components shown as units may be or not be physical units, i.e., may be located at one position, or may be distributed onto multiple network units. It is possible to select some or all of the units according to actual needs, for achieving the objective of embodiments of the present disclosure.

In addition, the functional units in the embodiments of the present disclosure may be integrated into one processing unit, or alternatively be separate units, or two or more units may be integrated into one unit. The integrated unit may be implemented in the form of hardware, or in the form of a combination of hardware and a software functional unit.

All or a part of the operations in the above embodiments can be implemented by hardware, or by relevant hardware instructed by a program. The program can be stored in a computer-readable storage medium. When the program is executed, the program performs steps including the above embodiments of the method. The above storage medium may be any medium capable of storing program codes, including a mobile storage device, a Read-Only Memory (ROM), a Random Access Memory (RAM), a magnetic disk, or an optical disc.

When the integrated unit is implemented in the form of the software functional unit and is sold or used as a stand-alone product, it can be stored in a computer-readable storage medium. Based on this understanding, all or part of the embodiments of the present disclosure, or the part thereof that contributes to the prior art, can be embodied in the form of a software product. The computer software product may be stored in a storage medium and contain instructions to enable a computer device, such as a personal computer, a server, or a network device, to perform all or part of the steps of the method described in each of the embodiments of the present disclosure. The storage medium may include various media capable of storing program codes, such as the mobile storage device, the ROM, the RAM, the magnetic disk, or the optical disc.

While the some embodiments of the present disclosure have been described above, the protection scope of the present disclosure is not limited to these embodiments. Therefore, these variants and alternatives are to be encompassed by the protection scope of present disclosure as defined by the claims as attached.

What is claimed is:

1. A cleaning method, applied to a cleaning device and comprising:

acquiring, by the cleaning device, a to-be-cleaned area;

determining, by the cleaning device, a cleaning section set based on the to-be-cleaned area, wherein the cleaning section set comprises a cleaning section and a cleaning sequence corresponding to the cleaning section, and the cleaning sequence of the cleaning section is determined according to a cleaning path of the cleaning section; and cleaning, by the cleaning device, the cleaning section in turn according to the cleaning sequence corresponding to the cleaning section;

wherein the to-be-cleaned area comprises: a first uncleaned area; and said determining the cleaning section set based on the to-be-cleaned area comprises:

dividing, by the cleaning device, the first uncleaned area into a first section and a second section, the first section being a section that the cleaning device has to pass through when the cleaning device moves out from a base station, and the second section being a section that the cleaning device might pass through when the cleaning device moves out from the base station; and determining, by the cleaning device, a cleaning sequence of the second section having a higher priority than a cleaning sequence of the first section.

2. The method according to claim 1, wherein said determining the cleaning section set based on the to-be-cleaned area comprises:

determining the cleaning section set corresponding to the to-be-cleaned area by querying a predetermined cleaning section table, wherein the predetermined cleaning section table comprises at least one saved cleaning area and a cleaning section set corresponding to each of the at least one saved cleaning area.

3. The method according to claim 1, wherein the to-be-cleaned area at least comprises: a first uncleaned area;

said determining the cleaning section set based on the to-be-cleaned area comprises:

dividing the first uncleaned area into a third section and a fourth section, the third section being a section that the cleaning device has to pass through when the cleaning device moves out from a base station to a first residual uncleaned area, the fourth section being a section that the cleaning device might pass through when the cleaning device moves out from the base station to the first residual uncleaned area, and the first residual uncleaned area being an area other than the first uncleaned area in the to-be-cleaned area;

determining a second uncleaned area adjacent to the first uncleaned area, and dividing the second uncleaned area into a fifth section and a sixth section, the fifth section being a section that the cleaning device has to pass through when the cleaning device moves out from the base station to a second residual uncleaned area, the sixth section being a section that the cleaning device might pass through when the cleaning device moves out from the base station to the second residual uncleaned area, and the second residual uncleaned area being an area other than the first uncleaned area and the second uncleaned area in the to-be-cleaned area;

determining a third uncleaned area adjacent to the second uncleaned area, and dividing the third uncleaned area into sections until each residual uncleaned area has been divided to obtain respective sections; and determining the cleaning section set based on the third section and the fourth section corresponding to the first uncleaned area, the fifth section and the sixth section corresponding to the second uncleaned area, and the respective sections corresponding to each residual uncleaned area.

4. The method according to claim 1, wherein said determining the cleaning section set based on the to-be-cleaned area comprises:

acquiring a map of the to-be-cleaned area, the map of the to-be-cleaned area at least comprising a base station;

obtaining at least one to-be-cleaned section by dividing the to-be-cleaned area based on the map of the to-be-cleaned area;

determining the cleaning path from the base station to each of the at least one to-be-cleaned section;

determining a section that the cleaning device might pass through corresponding to each of the at least one to-be-cleaned section based on the at least one to-be-cleaned section and the cleaning path corresponding to each of the at least one to-be-cleaned section; and obtaining the cleaning section set by sorting a cleaning sequence of the at least one to-be-cleaned section based on the section that the cleaning device might pass through corresponding to each of the at least one to-be-cleaned section.

5. The method according to claim 1, wherein said cleaning the cleaning section in turn according to the cleaning sequence corresponding to the cleaning section comprises:

recording, during a cleaning process, a current cleaning section as a target cleaning section in response to determining that the cleaning device needs to return to a base station; and returning to the target cleaning section after charging is completed, and continuing to clean according to the cleaning sequence.

* * * * *